Aug. 11, 1953
C. A. SAYER
2,648,748
ELECTRIC ARC STUD WELDING
Filed April 28, 1950
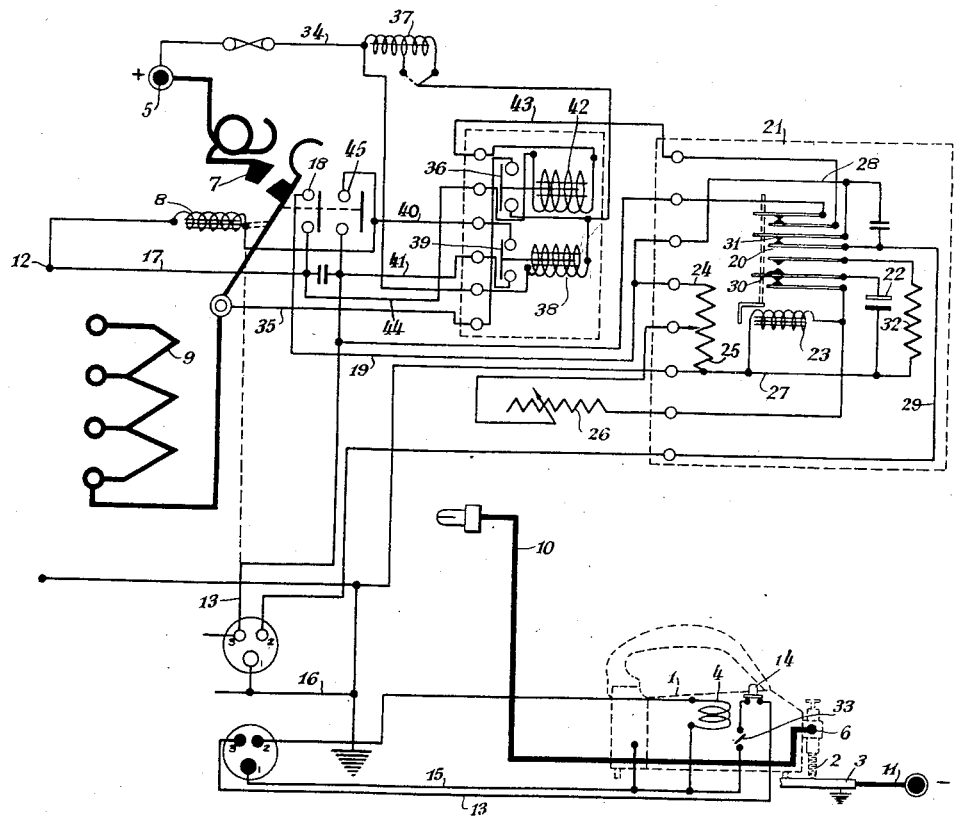
Charles Anthony Sayer
by Stevens Davis Miller & Mosher
Attorneys Patented Aug. 11, 1953

2,648,748

UNITED STATES PATENT OFFICE 2,648,748

ELECTRIC ARC STUD WELDING

Charles Anthony Sayer, London, England, assignor to Cyc-Arc Limited, London, England, a British company Application April 28, 1950, Serial No. 158,708
In Great Britain December 14, 1948

8 Claims. (Cl. 219—4)

This invention relates to the electric arc welding of metal or alloy studs, tubes, rivets, rods and the like (hereinafter termed "studs") to metal or alloy plates, strips, bodies or the like (hereinafter termed "plates") by a method consisting in connecting the stud and the plate in the welding circuit as the electrodes between which an arc is formed, contacting the stud with the plate, closing the welding circuit for the passage of current through the stud and the plate, withdrawing the stud a determined short distance from the plate to strike the arc, maintaining the arc for the period necessary for the surfaces that are to be welded together to acquire satisfactory welding temperatures, and then pressing the stud upon the plate to effect the weld, the flow of current in the welding circuit being maintained for the period necessary for the completion of a satisfactory weld.

By such basic method consistently satisfactory welds may be secured, irrespective of the metals or alloys involved, except in the event that the surface of the plate is badly scaled or rusted or heavily coated with paint. Under such conditions the poor contact between the stud and the plate results in a high electrical contact resistance, with the consequence that, on the closure of the welding circuit, the flow of heavy current prematurely melts the metal or alloy of the stud and the molten part is cooled by the relatively large mass of the plate and solidifies before the stud is lifted from the plate, thus causing the stud to become attached to the plate and preventing the lift.

The present invention seeks to improve or modify the method of welding so as to render the condition of the surface of the plate of little or no importance as a factor in determining the efficiency of the weld and to ensure that there is no failure of a stud to lift from the plate for the formation of the arc, and to provide improved control of the operation of the welding tool or apparatus whereby the desired objects may be attained. The invention has considerable importance in shipyards and like situations exposed to severe weather conditions, as it is here that heavily scaled or rusted plate surfaces are most frequent and the cost of removing the scale or rust to ensure clean plate surfaces is prohibitive.

According to the method of the invention, the stud and plate being connected in the welding circuit as the electrodes between which the arc is to be formed and the stud and plate being in contact, current of a limited value at full voltage is caused to flow in the welding circuit and thus between the stud and the plate, the stud is then separated from the plate the determined arcing distance, thereby forming an arc of low intensity, the current is then increased to full strength for the formation of the welding arc, the welding operation then proceeding to finality according to the basic method.

The means of control for securing the formation of the low intensity arc advantageously comprise an inductance affording resistance of a value suited to the requirements of a particular direct current welding circuit, which inductance is included in the welding circuit until after the stud has been withdrawn from the plate and the welding current at full strength has been applied, and is then cut out or short-circuited. Thus, it is convenient to connect the inductance, which is advantageously variable, across the contactor or switch by which the welding circuit is normally closed and to delay the closing of the said contactor or switch until the stud has been withdrawn from the plate to strike the low intensity arc. It may further be necessary to delay the functioning of the arc timing control device until the said contactor or switch has been closed, or to make such closure dependent upon or a function of the arc timing control device. It is desirable to effect the closure of the circuit through the said inductance under the control of the local switch of the tool or apparatus, for example, by the provision of an electro-magnetically controlled switch the operation of which is dependent directly or indirectly upon the closure of the said local switch. It is also advantageous to effect the closure of the main contactor or switch of the welding circuit electromagnetically, by the use of the current flowing in the circuit containing the inductance. The electro-magnetic device thus operated may serve directly to close the main contactor or switch or it may effect the initiation of the operation of the timing device, which may then effect the closure of the main contactor or switch.

In the use of an alternating current welding supply, similar considerations apply.

The invention is illustrated by the accompanying drawing, which represents, by way of example, a system of connections for a portable or hand tool.

The hand tool 1 is such that the retraction of the stud 2 from the plate 3 is effected by a magnet or solenoid 4. The welding circuit extends from the supply terminal 5 to the stud holder 6 of the tool by way of a main contactor 7, closed by the energisation of a coil 8, and a tapped resistance 9, into which the welding cable 10 of the tool is plugged. The plate 3 is connected to a return or second supply conductor 11, or may be earthed. The basic control circuits include a circuit extending from the control supply terminal 12 through the coil 8 and by the lead 13 as dotted to the control switch 14 of the tool and thence by a lead 15 to a return conductor 16. A second lead 17 from the terminal 12 is connected to auxiliary contacts 18 on the contactor 7. A lead 19 connects the contacts 18 to the relay 20 of the timing control device 21, which device may operate on the condenser charging method, the condenser 22 and the relay coil 23 receiving current by way of the lead 24, the resistance 25 and the timing control resistance 26, and being connected to a return lead 27. The leads 28 and 29 serve for the supply of current to the solenoid 4.

To modify these circuits for the application of the method according to the invention, the main contactor 7 is bridged by a circuit comprising the leads 34 and 35, which are connected by an electro-magnetically operated normally open switch 36, and the selected inductance 37, which may be variable, and, in parallel therewith, the operating coil 38 of switch 39. The latter is connected by the leads 40 and 41 into the lead 13 from the terminal 12 and the coil 8. The operating coil 42 of the switch 36 is connected by the lead 43 extending through contacts of the relay 20 to the lead 13 and thus to the local switch 14 of the tool, and by the lead 44 to the terminal 12. A second pair of auxiliary contacts 45 on the contactor 7 is connected across the leads 40 and 41 and the timing of the closure of the contacts 18 and 45 is adjusted so that they close before the main contactor contacts.

In the operation with the modified control circuits, when the switch 14 is closed, the coil 42 of the switch 36 is energised and the switch closed, so that current from the terminal 5 flows through the circuit comprising the lead 34, the switch 36, the inductance 37 and the lead 35 and thence by way of the resistance 9 and the lead 10 to the stud 2 and the plate 3 to the return cable 11. At the same time current flows through the operating coil 38, which is therefore energised and closes the switch 39, so that current flows through the coil 8 of the contactor 7 and the lead 13. The contactor therefore closes and, by reason of the adjustment of the auxiliary contacts 18 and 45, current is supplied to the timing device 21 through the lead 19 and the contacts 45 bridge the leads 40 and 41 before the main contacts of the contactor 7 close to short-circuit the inductance 37 and to establish the full welding current to the stud 2, but, in view of the time delay, the solenoid 4 has already been energised to lift the stud and to establish the low intensity arc which, on the closure of the main contacts of the contactor 7, is developed into the full welding arc. The condenser 22 is simultaneously being charged. In view of the short-circuiting of the circuit through the inductance 37, the coil 38 becomes de-energised and the switch 39 opens. Its function has, however, been taken over by the contacts 45. As the condenser 22 becomes charged, the coil 23 of the relay 20 is energised to throw over its contacts, so that the solenoid circuit is broken, to permit the stud to move to the plate for the weld and the condenser is discharged. The welding circuit is then broken as the result of the de-energisation of the coil 8 of the contactor 7 when the circuit through it is broken at the switch 33. The welding operation is thus complete.

The circuit of the coil 42 may include a normally closed switch under the control of the timing device, so that, at a determined time, the switch may be opened to de-energise the coil 42 in order to open the switch 36 and isolate the inductance 37.

The invention is not limited to any particular system of connections, so long as its essential features are involved. Thus, in some instances, it may be desirable to provide for the coil, such as 38, in parallel with the inductance 37, to control two switches, one, on closure, initiating the welding operation through elements of the timing device and the other short-circuiting the local control switch of the tool and permitting current to be supplied through it to the coil 42. It is then not important if the local switch is permitted to open prematurely. The second set of auxiliary contacts of the main contactor, such as the contacts 45, may close a circuit through a coil adapted to open a normally closed switch in the circuit of the coil 42, in the place of the timing device and at the same time the coil may close a switch whereby its own circuit is maintained.

I claim:

1. A method of welding studs to plates by electric arc welding, in which the stud and the plate are connected in the welding circuit as the electrodes between which the arc is to be formed, current of a limited value at full voltage is caused to flow from a source of supply of welding current in the welding circuit and between the stud and the plate while they are in contact, the stud is then separated from the plate the determined arcing distance while the current of limited value continues to flow, thereby forming an arc of low intensity, the current in the welding circuit is subsequently increased to full strength for the development of the arc into the full welding arc, and, after a determined interval, the stud is returned to the plate to effect the weld, the flow of current being continued for a further determined interval to complete the weld.

2. A method of welding studs to plates by electric arc welding, in which the stud and the plate are connected in the welding circuit as the electrodes between which the arc is to be formed, an inductance is connected into the welding circuit and current at full voltage but of limited value is thereby caused to flow by way of the inductance and between the stud and the plate while they are in contact, the stud is then separated from the plate the determined arcing distance while the current of limited value continues to flow, thereby forming an arc of low intensity, the inductance is subsequently rendered ineffective for the increase to full strength of the current in the welding circuit and the consequent development of the arc into the full welding arc, and, after a determined interval, the stud is returned to the plate to effect the weld, the flow of current in the welding circuit being continued for a further determined interval to complete the weld.

3. In welding a stud to a plate by electric arc welding, a holder for the stud, means applying pressure upon the holder tending always to move it towards the plate, electro-magnetic means operable to retract the holder and to retain it against the pressure acting upon it, a source of supply of welding current, a welding circuit normally open and connected to the source of supply and including the stud to be welded and the plate as electrodes between which the arc is formed, a starting switch adapted to initiate the welding operation, an inductance connected in open circuit to the welding circuit, the starting switch being operable to include the inductance in the welding circuit, so that a current of limited value flows through the stud and the plate, time delay means initiated by the inclusion of said inductance in the welding circuit, a normally open control circuit connected to and, when closed, operable to energise the electro-magnetic means at an instant determined by said time delay means and switch means connected in and closing the welding circuit independently of the inductance.

4. In welding a stud to a plate by electric arc welding, a holder for the stud, means applying pressure upon the holder tending always to move it towards the plate, electro-magnetic means operable to retract the holder and to retain it against the pressure acting upon it, a source of supply of welding current, a normally open welding circuit connected to the source of supply and including the stud to be welded and the plate as electrodes between which the arc is formed, a starting switch, a contactor included in and operable to make and break the welding circuit, an inductance connected in a circuit in parallel with the said contactor, a normally open switch in the inductance circuit energised to close in response to the closure of the starting switch while the contactor remains open, a relay connected in parallel with the inductance and operable when the inductance circuit is closed, a control circuit including the electro-magnetic means, contacts in the said circuit and in the contactor that close in succession when the relay is energised, the contacts in the contactor, when closed, establishing the full welding circuit independently of the inductance circuit, and a timing device determining the timing of the sequence of the steps of the welding operation.

5. In welding a stud to a plate by electric arc welding, according to claim 4, a control circuit including the starting switch and a switch operating coil and a normally open switch in the inductance circuit, the coil when energised being operable to close the switch in the inductance circuit.

6. In welding a stud to a plate by electric arc welding, according to claim 4, contacts in a circuit in parallel with the relay circuit, the relay, when energised, being operable to close the contacts and the said contact circuit being then operable to maintain the contactor closed when the relay is de-energised.

7. In welding a stud to a plate by electric arc welding, according to claim 4, a control circuit including the starting switch, a normally closed switch and an operating coil, and a normally open switch in the inductance circuit, the coil, when energised, being operable to close the switch in the inductance circuit and the timing device independently opening the normally closed switch.

8. In welding a stud to a plate by electric arc welding, a holder for a stud, means applying pressure upon the holder tending always to move it towards the plate, electro-magnetic means operable to retract the holder and to retain it against the pressure acting upon it, a source of welding current, a normally open welding circuit connected to the said source and including the stud to be welded and the plate as electrodes between which the arc is to be formed, a contactor included in and making and breaking the welding circuit, a starting switch for initiating the welding operation, a control circuit in which the starting switch is included, an electro-magnetically operating switch the operating coil of which is in the said control circuit, a circuit connected in parallel with the contactor and normally broken by the electro-magnetically operating switch, an inductance included in the said circuit, a second electro-magnetically operating switch the operating coil of which is connected in parallel with the inductance, a circuit normally broken by the said second electro-magnetically operating switch and including the operating coil of the contactor, a normally open controlling circuit for the electro-magnetic means, contacts in the said controlling circuit adapted to be closed on energisation of the operating coil of the contactor prior to the closure of the welding circuit by the contactor, and a timing device provided with switch means included in the controlling circuit of the electromagnetic means and determining the opening of the said circuit at the said switch means.

CHARLES ANTHONY SAYER.

References Cited in the file of this patent

UNITED STATES PATENTS

| Number | Name | Date |
|---|---|---|
| 2,214,868 | Welch | Sept. 17, 1940 |
| 2,417,907 | Bowen et al. | Mar. 25, 1947 |
| 2,449,456 | Croco et al. | Sept. 14, 1948 |
| 2,462,882 | H. Martin | Mar. 1, 1949 |
| 2,475,907 | B. Martin | July 12, 1949 |